(12) United States Patent
Burkett (10) Patent No.: US 8,368,240 B1
(45) Date of Patent: Feb. 5, 2013

(54) ROOF INSTALLED WIND TURBINE VENT AND SOLAR PANEL ELECTRIC POWER GENERATION SYSTEM

(75) Inventor: Bob Burkett, Fort Myers Beach, FL (US)

(73) Assignee: Bob Burkett, Austin, TX (US)

( * ) Notice: Subject to any disclaimer, the term of this patent is extended or adjusted under 35 U.S.C. 154(b) by 527 days.

(21) Appl. No.: 12/624,398

(22) Filed: Nov. 23, 2009

Related U.S. Application Data (60) Provisional application No. 61/200,007, filed on Nov. 24, 2008.

(51) Int. Cl.
*F03D 9/00* (2006.01)
(52) U.S. Cl. .................................... 290/44; 290/55
(58) Field of Classification Search .............. 290/55, 290/44
See application file for complete search history.

(56) References Cited

U.S. PATENT DOCUMENTS

| | | | |
|---|---|---|---|
| 4,379,972 A * | 4/1983 | Sosa et al. | 290/44 |
| 4,759,272 A * | 7/1988 | Zaniewski | 454/344 |
| 5,049,801 A * | 9/1991 | Potter | 318/785 |
| 5,131,888 A * | 7/1992 | Adkins, II | 454/343 |
| 6,043,565 A * | 3/2000 | Les Strange | 290/55 |
| 6,306,030 B1 * | 10/2001 | Wilson | 454/16 |
| 6,765,309 B2 * | 7/2004 | Tallal et al. | 290/55 |
| 6,798,082 B1 * | 9/2004 | Chen | 290/55 |
| 7,025,670 B1 * | 4/2006 | Robinson | 454/19 |
| 7,507,151 B1 * | 3/2009 | Parker et al. | 454/368 |
| 7,579,701 B1 * | 8/2009 | White | 290/43 |
| 7,777,361 B2 * | 8/2010 | Hsieh | 290/55 |
| 7,839,010 B2 * | 11/2010 | Harvey | 290/55 |
| 2003/0190883 A1 * | 10/2003 | Shockey | 454/19 |
| 2008/0265584 A1 * | 10/2008 | Teng | 290/55 |

FOREIGN PATENT DOCUMENTS

| | | | |
|---|---|---|---|
| CA | 2420491 A1 | * | 8/2004 |
| JP | 63282435 A | * | 11/1988 |
| TW | 200842239 A | * | 11/2008 |
| WO | WO 2006138747 A2 | * | 12/2006 |

OTHER PUBLICATIONS

Southwest Wind Power, website publication, http://www.windenergy.com/products/air.htm.
Airbreeze Specification Sheet, 3-CMLT-1095-01 REV D Jul. 2009.
Air X Specification Sheet, 3-CMLT-1095-01 REV D Jul. 2009.

* cited by examiner

*Primary Examiner* — Joseph Waks (57) ABSTRACT

Systems and methods for generating electrical electricity use a wind turbine vent and an electrical generator operably coupled to the wind turbine for generating electricity from spinning of said wind turbine. An air flow guiding device extends between the wind turbine and a fan for guiding fan generated moving air between the wind turbine and fan. One or more solar panels for powering said fan are provided. When the system is installed on a building, the wind turbine turns as a result of outside wind, hot rising air escaping outside through the wind turbine vent, moving air generated by the fan powered by the solar panel, or a combination thereof, and thereby generates electricity. A solar battery can also be used for powering the fan. The system can be used to cool or heat the building while generating electricity.

13 Claims, 6 Drawing Sheets

ROOF INSTALLED WIND TURBINE VENT AND SOLAR PANEL ELECTRIC POWER GENERATION SYSTEM

CROSS-REFERENCE TO RELATED APPLICATIONS

This application claims the benefit of the filing of U.S. Provisional Patent Application Ser. No. 61/200,007, entitled "The Solar Roof Dynamo with a Gearing System and Microprocessor Controller Connected to the Air-Conditioning System", filed on Nov. 24, 2008, and the disclosure of which is incorporated herein by reference in its entirety.

TECHNICAL FIELD

Embodiments relate to fields of electricity generation and, more particularly but not exclusively, to systems and methods which use wind energy, solar energy and/or thermal energy to generate electricity in a house or other building.

BACKGROUND

Wind, solar, thermal and battery power converted to electrical energy is the fastest growing segment of the sustainable energy field. Currently, the standard design for the wind turbine is modeled after an old time windmill. While this application certainly works it leaves a lot to be desired. In a large "wind farm" facility with many acres to utilize the wind mill design works very well. However, in an urban setting this type of design would require from ½ acre to an entire acre of land in order to be erected. This is due to the fact that the wind turbine is placed on a tower that rises 30 feet' or more in the air and therefore requires guyed wires for stability except in certain models.

There is a need for improved systems and methods for generating electricity from sustainable energy.

BRIEF SUMMARY

The following summary of the invention is provided to facilitate an understanding of some of technical features related to techniques, apparatus and systems for generating electricity in a building and is not intended to be a full description. Examples of methods, apparatus and systems are described for generating electricity using wind energy, thermal energy, solar energy, battery power, or a combination thereof. A full appreciation of the various aspects of the invention can be gained by taking the entire specification, claims, drawings, and abstract as a whole.

The aforementioned aspects of the invention and other objectives and advantages can now be achieved as described herein.

According to one aspect, there is provided a system for generating electrical energy. In one example of an embodiment, the system has a wind turbine vent for attaching to a roof and a fan for moving air through the wind turbine to spin the wind turbine vent. A shroud attaches the fan adjacent the wind turbine vent. An alternator is fixed within the shroud and between the wind turbine vent and the fan. A shaft operably connects the wind turbine with the alternator, the alternator generating electricity from spinning of the wind turbine. One or more solar batteries are provided for powering the fan. A solar panel is provided for powering the fan and/or the battery. A controller is configured to control sending of power from the solar panel to the fan and/or the at least one battery and sending of power from the at least one battery to the fan. When the system is installed in a house, the wind turbine turns as a result of outside wind, hot rising air escaping through the roof, moving air generated by the solar/battery powered fan, or a combination thereof, and thereby generates electricity.

According to another aspect, there is provided a system for generating electricity in a building. In one example of an embodiment, the system has a wind turbine vent for attaching to a roof of a building and an electrical generator operably coupled to the wind turbine for generating electricity from spinning of the wind turbine. A fan is provided for generating moving air through the wind turbine between the outside and inside of the building to spin the wind turbine. An air flow guiding device extends between the wind turbine and the fan for guiding the generated moving air between the wind turbine and the fan. One or more solar panels are provided for powering the fan. When the system is installed on a building, the wind turbine turns as a result of outside wind, hot rising air escaping outside through the wind turbine vent, moving air generated by the fan powered by the solar panel(s), or a combination thereof, and thereby generates electricity According to yet another aspect, there is provided a method for generating electricity in a building. In one example of an embodiment, the method comprises the steps of: providing a wind turbine vent in a roof of a building; an electrical generator operably connected to the wind turbine, the electrical generator being capable of converting spinning of the wind turbine into electricity; a solar powered fan disposed proximate the wind turbine for moving air; and an air guide for guiding moving air generated by the fan through the wind turbine; spinning the wind turbine using natural outside wind, spinning the wind turbine using rising air escaping the building, spinning the wind turbine by moving air through the wind turbine using the solar powered fan, or a combination thereof, and generating electricity from the spinning wind turbine.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Technical features described in this application can be used to construct various systems and methods for generating electricity in a building.

In the following description, for purposes of explanation and not limitation, specific details are set forth, such as particular embodiments, procedures, techniques, etc. in order to provide a thorough understanding of the present invention. However, it will be apparent to a person of ordinary skill in the art that the present invention may be practiced in other embodiments that depart from these specific details. For example, while one of the example embodiments is described in an example application in which the system is installed in a house, the system can be installed in other types of residential buildings or in commercial buildings. Furthermore, while one of the example embodiments is described in an example application in which the system is used on a pitch roof with an attic beneath the roof, the system can be used on either a pitched roof or flat roof with or without other types of enclosures beneath the roof.

In some instances, detailed descriptions of well-known methods, interfaces, devices, and signaling techniques are omitted so as not to obscure the description of the present invention with unnecessary detail. Moreover, individual function blocks are shown in some of the figures. Those skilled in the art will appreciate that a controller need not be specifically a microprocessor as described in one of the example embodiments. The controller may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
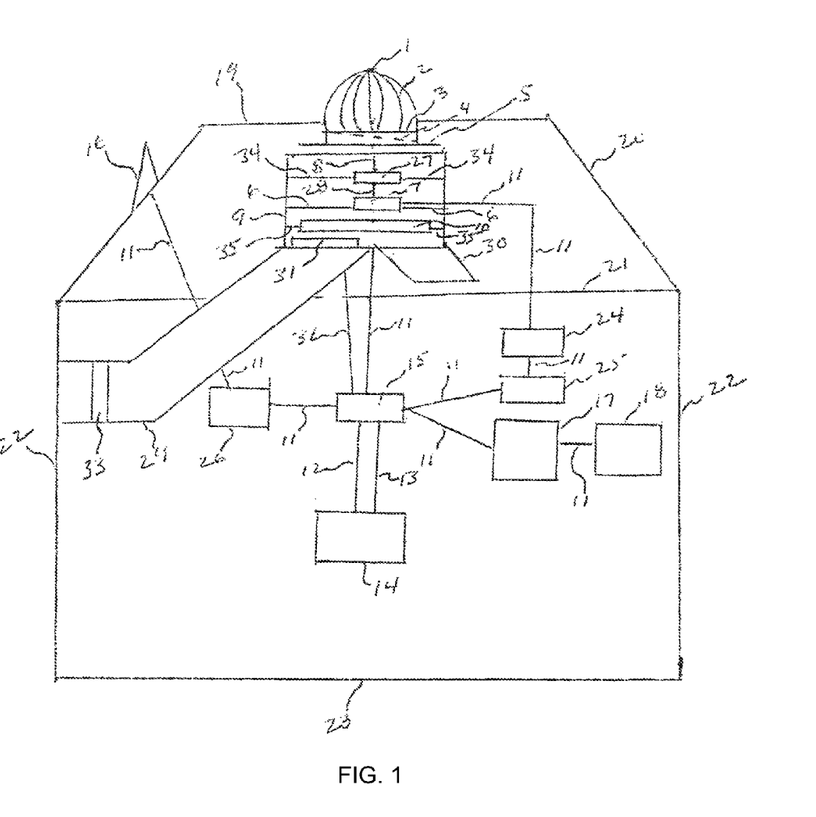
FIG. 1 illustrates a diagram of an exemplary system for generating electricity in a house according to one embodiment.

Referring now to FIG. 1 of the accompanying drawings, an exemplary system for generating electricity according to one embodiment is shown installed in a house. The system includes a "Roof Dynamo" which is a unique product designed to convert wind energy, solar power, thermal energy and battery power into electrical energy in an extremely efficient and affordable fashion. The Roof Dynamo can utilize outside wind for turning the turbine, the interior heat of the attic and/or a solar battery powered reversible auxiliary fan attached to the base of the unit. The unit can also import outside air into the air conditioner ducts thereby reducing the need for the air conditioner or the heater while still creating electricity from the turning of the turbine. An alternator can produce electricity from either direction of the spinning of the wind turbine.

The Roof Dynamo does not require either a tower or guyed wires. It is a unique solution for a substantial problem. The typical urban home in America does not have ½ acre to an entire acre to place a wind turbine. Furthermore, many areas have deed restrictions that would prohibit their placement even if the space were available. Finally, the neighbors have a tendency to squawk when they see the windmill design. The Roof Dynamo difference is the style of rotor that is used. A standard roof wind turbine (or "whirly bird" design) is the catalyst for the change. This design can be used on any pitched slope roof and is not prohibited by any deed restrictions. It does not require a tower thereby lowering its costs. Furthermore, it does not need guyed wires thereby reducing the need for up to an acre of land. The Roof Dynamo can turn on wind power alone. Also, during the summer and the fact that hot air rising and expanding from the attic will turn the rotor even on a day or night of no wind is a major improvement over the windmill design. Finally, a solar panel on the roof is connected to a controller that determines whether to send power to the fan, the battery or the inverter.

Each Roof Dynamo will have a minimum of one battery. The deep cycle battery (or more depending on the load) will be located in the attic. These batteries are also connected to the same controller that sends power as needed to four solar/battery powered (DC motors) fans that are connected to the Roof Dynamo with sheet metal (the shroud). The controller serves as "master control" for the decision on how to use the power that is available. Four Roof Dynamo's should be placed on a single home of average size and connected to a single inverter. On larger homes with larger attics more Dynamo's could be installed. With this process complete the turbine and the alternator could spin constantly. Also, the fan attached to the base of the shroud is a fan that is reversible in order to "push" hot air out of the attic during the summer or "pull" cool/warm air into the air conditioning system of the house in order to aid in the proper interior temperature of the home.

The Roof Dynamo exterior shell consists of a known design made out of aluminum or a composite material. This "wind turbine" or "whirly bird" design already exists on many homes. This "better mouse trap" utilizes a superior design since the wind, hot air rising, solar power and a battery turning an auxiliary fan 10 that turns the turbine and powers an alternator that creates electricity for the home.

The first component is a wind turbine that is attached to the roof. The turbine is then aligned with the slope of the roof. The turbine should be placed partially above the peak of the roof. The roof must have a pitch in order for room for the electronics in the attic and for hot air to accumulate. The turbine of the Roof Dynamo spins with both a breeze and/or if there is enough hot air in the attic as it escapes through the top of the roof where the turbines are located. The solar/battery-powered auxiliary fan also powers it.

The top of the turbine 1 is an existing design that will be incorporated within the new concept. Turbine blades 2 turn the turbine in both windy conditions and hot times due to the fact that hot air rises and expands within the attic. This is the bottom ring of turbine—the base 3. Adjustable slot 4 for the turbine to match the roof pitch—it is an adjustable pitch mechanism. Base of turbine 5—attached to roof by any means necessary (screw, nails, caulk etc.).

The Roof Dynamo's spinning turbine has a vertical stabilizer bar 8 that serves as the main shaft that turns the alternator or an optional gearing system 27. An adjustable horizontal/vertical stabilizer bar 6 for the alternator is attached to the shroud 9. The main shaft 8 is connected to either the gear box 27 or directly to the alternator 7 that creates the electricity. A conduit 11 is attached to a lightning arrestor 24 that is attached 11 to a mini-breaker panel 25. The mini breaker panel is then attached via conduit 11 to a controller which is a microprocessor 15 that controls the decision to utilize either solar, wind, thermal or battery power (or a combination of all four) to spin the turbine and governs the electrical output to the battery and/or the inverter. The microprocessor is ultimately connected to the solar panel 16, alternator 7, battery 14, the fan 10 and the inverter 17. A solar panel 16 is connected to a voltage regulator 26 that is connected to the controller/microprocessor. The controller 15 knows all the temperatures of the outside of the house, the attic and the interior of the house. The controller compares the temperature of the outside air, attic air and the temperature of the home. The controller decides whether the sliding panel covers the air conditioner duct or the duct to the attic. The fan then "pushes" the hot air from the attic or it "pulls" moderate air (70-80 degrees) from the outside into the air-conditioning system. It can synchronize its operation according to the needs of the individual home. The controller also monitors the voltage output. If at any time the voltage is low the solar/battery fan automatically kicks in.

Battery 14. Inverter 17 the energy is converted from DC to AC power and is a grid-tie inverter. AC Fuse box 18 this is already in the home. This is the roofline 19 at the top of the house. Slope line of the roof 20. This is the soffit Line of the roof 21. This is the outside wall of the house 22. This is the bottom of the house 23. Voltage regulator 26. Gearbox 27.

Connector from gearbox to alternator 28. Air Conditioning Duct connected to the A/C Unit 29. Duct to attic-open ended 30. Sliding panel 31 designed to cover either the attic duct or the air conditioning duct connection. Conduit from sliding panel to controller 32. Removable air filter 33. Attachment for the gearbox to the shroud 34. Attachment for the fan to the shroud 35.

The Roof Dynamo is designed to allow affordable wind, thermal, solar and battery generated electricity to homes throughout the world with a pitched roof and a warm climate being the best. A typical home would have four Roof Dynamos' that could deliver approximately $1,000 or more per year. A homeowner could order the equipment and then have a contractor/electrician install the equipment or pay a company for a turnkey operation. An electrical meter could evaluate the amount of electricity being produced. Warning: This device is attached to the electrical grid. It is not recommended that anyone other than a licensed electrician install the equipment to the grid. The system generates electricity from sustainable energy and does not require either a tower or guyed wires. Furthermore, the installed system can be made undetectable from the street and is relatively silent during operation.

Figure 2:
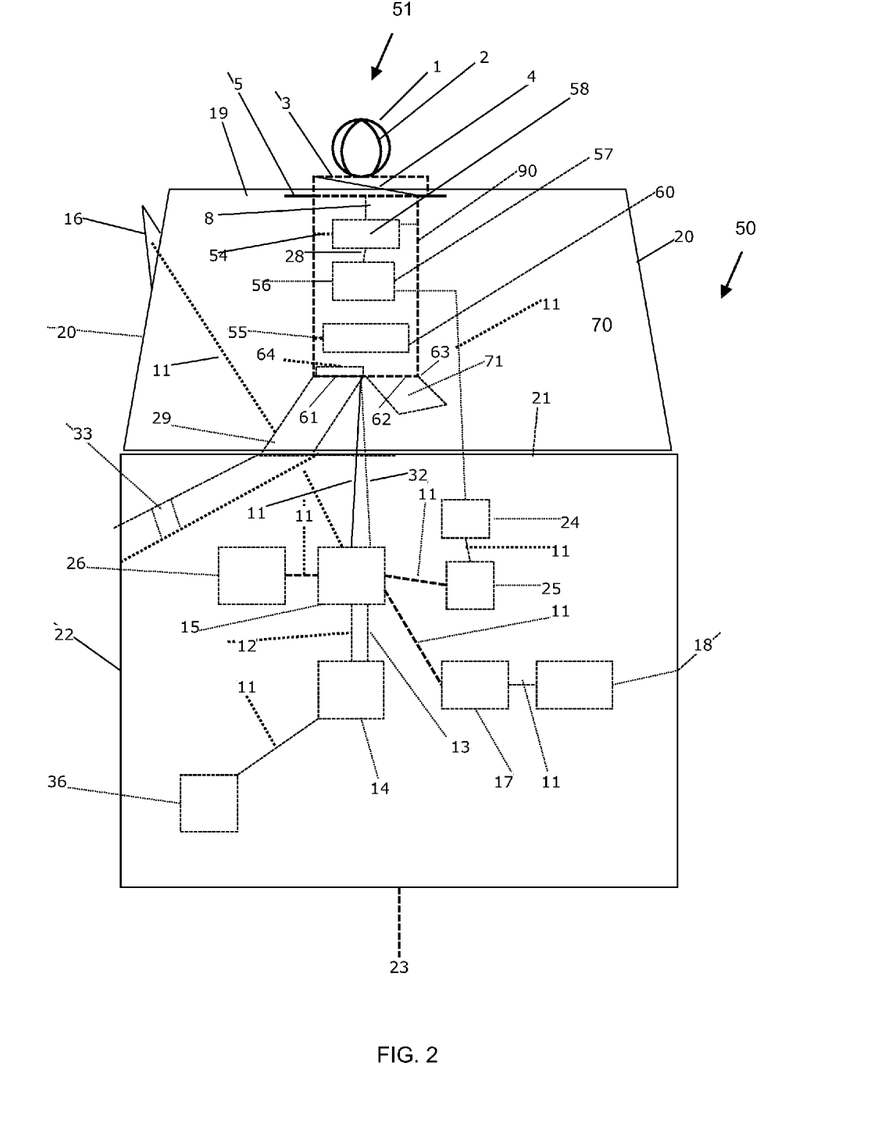
FIG. 2 illustrates a block diagram of a system for generating electricity in a building according to another embodiment.

FIG. 2 illustrates a block diagram of a system for generating electricity in a building according to another embodiment. The system of FIG. 2 is implemented in a building 50 which can be any type of residential or commercial building. Building 50 includes an enclosure 70 which can be an attic beneath the roof, as shown in FIG. 2, or some other type of enclosure. Wind turbine vent 51 includes turbine blades 2 and base 3. An open end of an air guiding device 90 is fixed to or contiguous with wind turbine base 2. Air guiding device 90 extends downwardly from the wind turbine base 2 and is configured to guide air between wind turbine vent 51 and first and second air flow connections 61, 62 disposed about the base 63 of the air guiding device.

Wind turbine vent 51 is operably connected to an electrical generator 57 for generating electricity from spinning of the wind turbine vent 51. Whilst in the illustrative embodiment of FIG. 2, electrical generator 57 is a DC alternator for connecting to inverter 24, other types of generators 57 can be used which are capable of converting spinning energy of the wind turbine into electrical energy, such for example an AC generator. Wind turbine vent 51 is operably connected to the electrical generator 57 by means of a gearing system 58 operably interconnecting the wind turbine vent 51 and electrical generator 57. Gearing system 58 is configured to increase the turning speed of the electrical generator 57. The gearing system 58 can be configured for exponentially increasing electrical generation. Main shaft 8 operably connects wind turbine vent 51 to gearing system 27. Connector 28 operably connects gearing system 58 to electrical generator 57.

In the illustrative embodiment of FIG. 2, gearing system 58 and generator 57 is disposed within the guiding device between the wind turbine vent 51 and fan 60. Gearing system 58 is attached to the interior wall of the air guiding device 90 by means of attachment 54. Generator 57 is attached to the interior wall of the guiding device 90 by means of horizontal/vertical stabilizer bar 56. Electric fan 60 is attached to the interior wall of the guiding device 90 by means of attachment 55. Fan 60 is disposed within the air flow guiding device above base 63 thereof. More than one fan can be used. An electronic actuable opening/closing device 64 is configured about or on the air guiding device base for opening/closing respective air flow connections 61, 62 formed in or about air guiding base.

In the illustrative embodiment of FIG. 2, guiding device 90 is a wind tunnel. The wind tunnel is formed as a shroud of sheet metal, or other suitably rigid material, which enables support/stabilization of the gearing system, alternator and fan. Any type of suitably shaped guiding device 90 can be adopted which is capable of sufficiently directing and/or confining air flow between the wind turbine vent 51 and air flow connections 61,62. The resulting force of the fan air flow can be sufficient to create compressed air at the base of the turbine. By way of example, the wind tunnel structure of FIG. 2 in conjunction with a 12 V fan is configured to provide generation of upto a 25 pm wind.

All or some of the wind turbine vent, generator, gearing system, electric fan, air guiding device and associated connections/attachments can be configured to be pre-assembled before installation in the building or assembled during system installation.

In the illustrative embodiment of FIG. 2, first air flow connection 61 is operably connected to an air conditioner or ventilation duct 29 for passing air between the inside of the building and the air guiding device 90. Second air flow connection 62 is connected to a duct 71 for passing air between the enclosure 70 and air guiding device 90. In the illustrative embodiment of FIG. 2, the opening/closing device is an electronic actuable slidable panel which is configured to be slidable on the air guiding device base. The panel is slidable between a first position in which the panel covers the first air connection 61 for the air conditioner/ventilation duct 29 and uncovers the second air connection 62 for the enclosure duct and a second position in which the panel uncovers the first air connection 61 and covers the second air connection 61 for the enclosure duct. However, other types of opening/closing devices may be used. For example, a rotatable panel may be used to open and close the air connections, or a pair of panels may be used to open and close respective air connections.

Inverter 24, solar panel 16, controller 15, mini breaker panel 25, solar battery 14, voltage regulator 26, fuse box 18, and associated connections are connected and arranged in the same manner as for the system of the embodiment of FIG. 1. Controller 15 may be a micro processor or other type of electronic controller. Solar battery 14 and fan run on a 12 V system but may run on other voltage rated systems. System of FIG. 2 additional includes a thermostat system 36. As will be explained in more detail hereinafter, this thermostat is connected to controller 15 to enable the system to control cooling and/or heating of the building based on inside and outside temperature. For example, as will be described in more detail hereinafter, thermostat 36 and controller 15 can be used to control when cooler outside air is imported into the air conditioner or ventilation vent or warmer air is expelled from the enclosure for the purpose of cooling the building while generating electricity.

In the illustrative embodiment of FIG. 2, thermostat 36 is located on the inside of the building. Temperature sensors (not shown) are arranged on the inside and outside of the building and in the enclosure to provide signals representing the outside temperature, inside temperature and enclosure temperatures, respectively, to the thermostat and/or controller. Note that one or more of the system components/connections which are shown in FIG. 2 as being located in the building below enclosure 70 may instead be located in enclosure 70 itself.

Whilst the system of the embodiment of FIG. 2 can include an enclosure, the system need not be used in conjunction with such an enclosure and the duct for the enclosure may instead be provided to access air in an open space located in an upper region of the building.

Furthermore, whilst in the system of the embodiment of FIG. 2, air guiding device base 63 includes a pair of air connections, in an alternative embodiment, the system may be used with a singe air flow connection or more than two air flow connections for connection to appropriate ducts and an open/closing device for opening and closing respective air flow connections. Yet furthermore, whilst in the embodiment of FIG. 2, the wind turbine vent is attached to the roof and the air guiding device is located in the enclosure beneath the roof, in an alternative embodiment (not shown), the wind turbine vent, air guiding device, gearing system, generator, fan, opening/closing device and associated components can be placed above the roof, in particular a flat roof, and, if necessary, mounted in a housing disposed above the roof. The ducts can extend through the roof to the air flow guiding device disposed above the roof.

In yet another embodiment, a single air flow connection is provided about the air guiding device base or the air guiding device has an open base.

Figure 3:
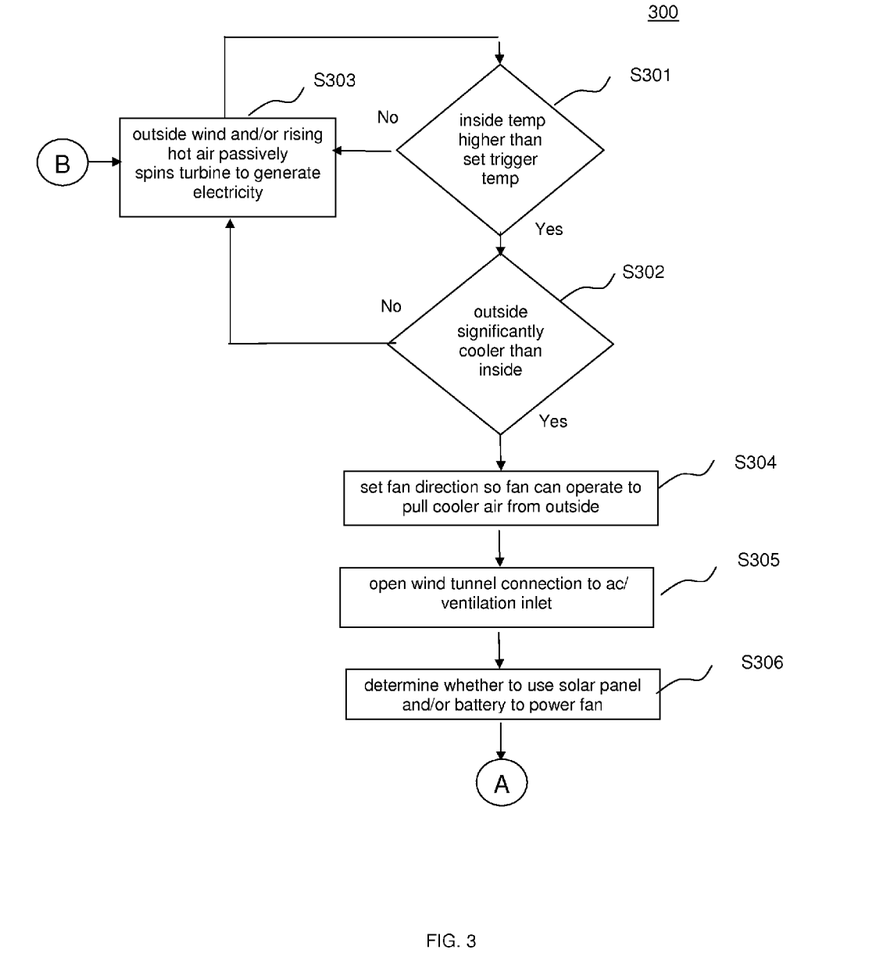
FIGS. 3 & 4 illustrate a flow chart outlining a method for generating electricity whilst cooling a building according to one embodiment.
Figure 4:
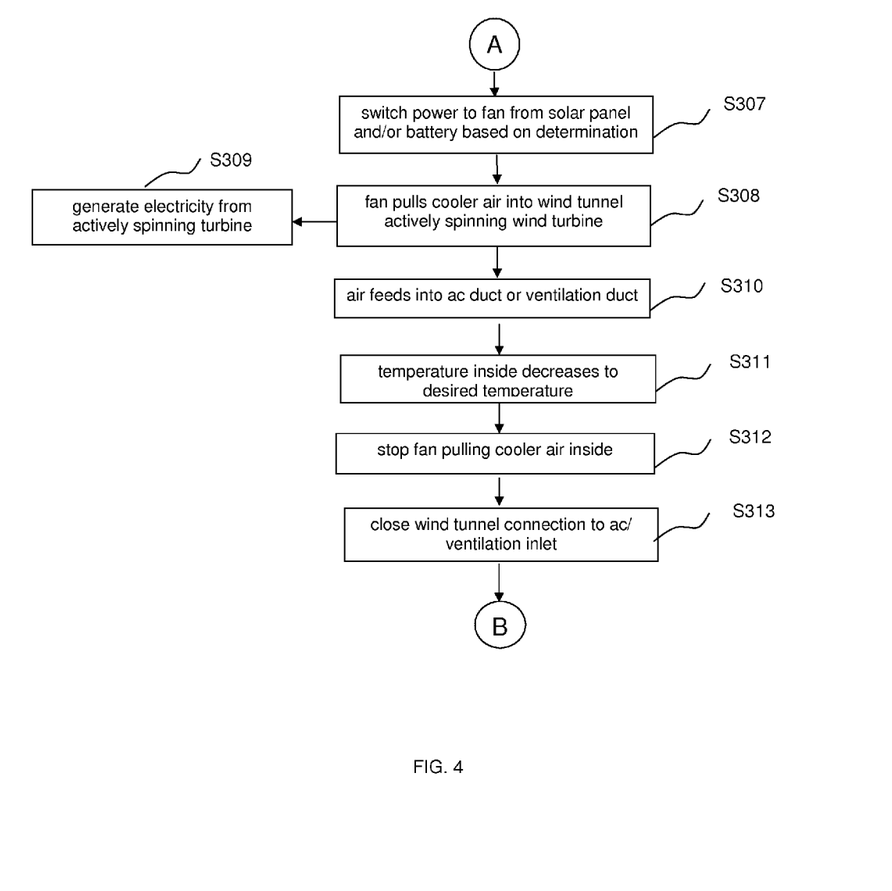

FIGS. 3 & 4 illustrate a flow chart outlining a method for generating electricity whilst cooling a building according to one embodiment. Method 300 will be described implemented in the system of FIG. 2 but may be also implemented in systems according to other embodiments or other systems, as appropriate.

Let us assume by way of example that the wind turbine vent 51 and generator 57 are generating electricity passively, that is, by the wind turbine spinning as a result of outside wind and/or hot air rising. Consider that thermostat 36 inside the building is set to a desired temperature for triggering the system to cool the inside of the building. In method 300, a determination is made as to whether the inside temperature of the building is higher than the desired temperature for triggering the cooling operation (S301). In the system of FIG. 2, thermostat 36 can do this by comparing the inside temperature sensor reading with the set desired temperature. If the inside temperature is not higher than the set desired temperature, wind turbine vent 51 continues to generate electricity passively (S303). However, if the inside temperature reaches or is higher than the set desired temperature, the cooling process continues and a determination is made as to whether the outside is cooler than the building inside (S302). Thermostat 36 can determine this by comparing the outside temperature sensor reading with the inside temperature sensor reading. If the outside is not cooler than the inside, wind turbine vent 51 continues to generate electricity passively (S303). However, if the outside is significantly cooler than the inside, the process proceeds to set the direction of the fan so that, when operated, the fan will pull cooler air from outside into the system (S304). By way of example, if the desired temperature for triggering the process is 85 degrees, and the outside air temperature is a moderate 70-80 degrees, the thermostat would determine the outside to be significantly cooler than the set temperature.

Wind tunnel connection to the air conditioner or ventilation duct is then opened (S305). In the system of FIG. 2, this is achieved by controller 15 electronically actuating the slidable panel. A determination is then made as to how to use available power to power the fan. In process 300 of FIGS. 3 & 4, a determination is made as to whether to use power from the solar battery and/or the solar panel (S306). This determination can be based on one or a combination of factors. For example, determining factors may include the level of charge available in the solar battery, how much electricity the solar panel is generating, and whether the solar battery needs to be full discharged at the beginning of the day in preparation for its next charging cycle. The controller can determine these parameters from monitoring of the battery power, solar panel power, and a timer/clock associated with the controller.

Power is selectively switched to the fan from the solar panel and/or battery based on the determination made in process S306. Note that whilst FIG. 3 indicates that determining whether to use battery or solar power is made at this particular stage in the process, this determination can be made dynamically or repeatedly so that power from the solar panel and/or battery is selectively switched through to the fan on an as available basis.

The fan then pulls the cooler outside air into the wind tunnel and, in doing so, actively spins the wind turbine (S308). This generates electricity (S309). At the same time, the pulled cooler air feeds into the AC or ventilation duct (S310). This causes the cooler air to enter the inside of the building, lowering the inside temperature. Once the inside temperature decreases to or below the set desired trigger temperature (S311), power to the fan is cut off and the fan stops pulling air from outside (S312). Thermostat 36 can compare the inside temperature to the set desired temperature. Controller cuts off power to the fan in response to thermostat determining inside temperature sensor reading has decreased to or below set desired temperature. At his point, the wind tunnel connection to the ac or ventilation duct can be closed (S313). The process returns to S303.

Note that at least some of the processes S301 to S313 may be performed in one or more different sequences from the sequence shown in FIGS. 3 & 4. For example, S304 may be performed after either S305 or S306, and S306 may be performed before S305. Note also that with reference to the system of FIG. 2, some all or all of the processes that are described above as being performed by the thermostat can be performed by the controller and vice versa.

Figure 5:
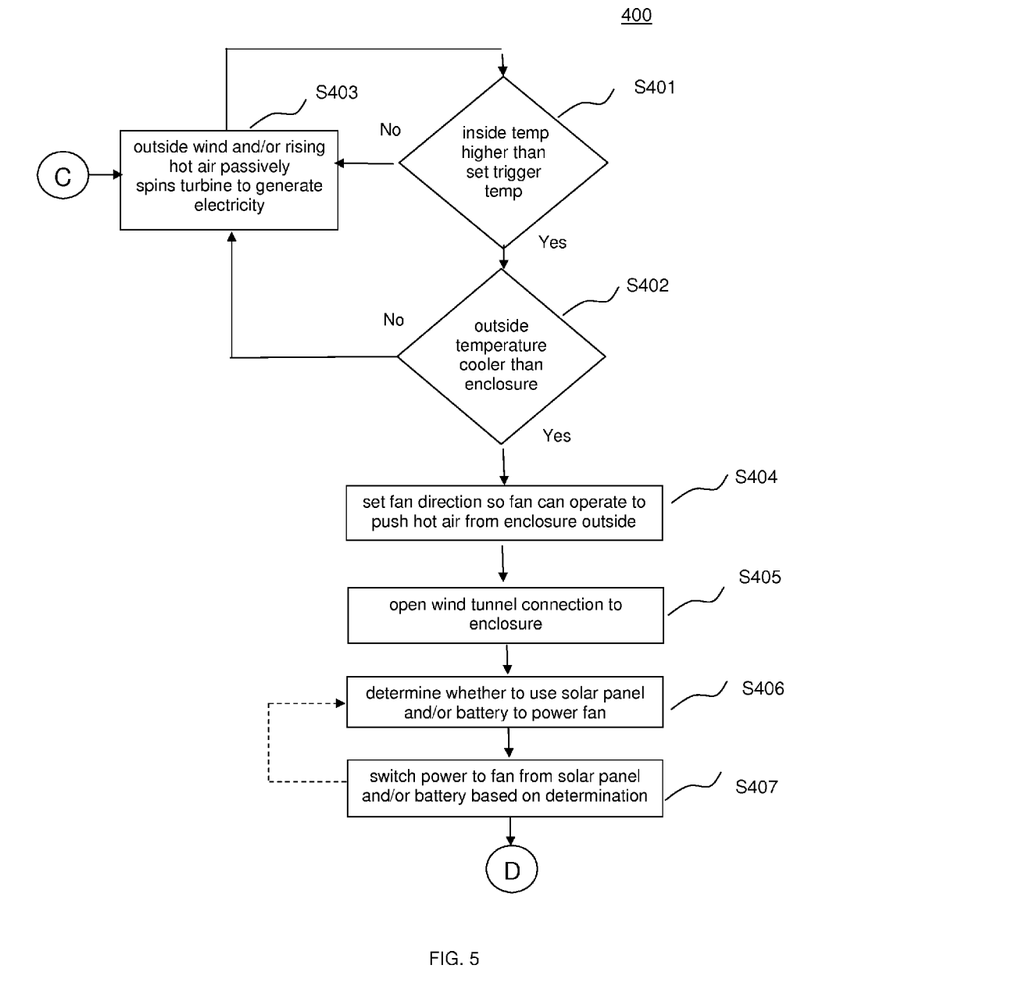
FIGS. 5 & 6 illustrate a flow chart outlining a method for generating electricity whilst cooling a building according to another embodiment.
Figure 6:
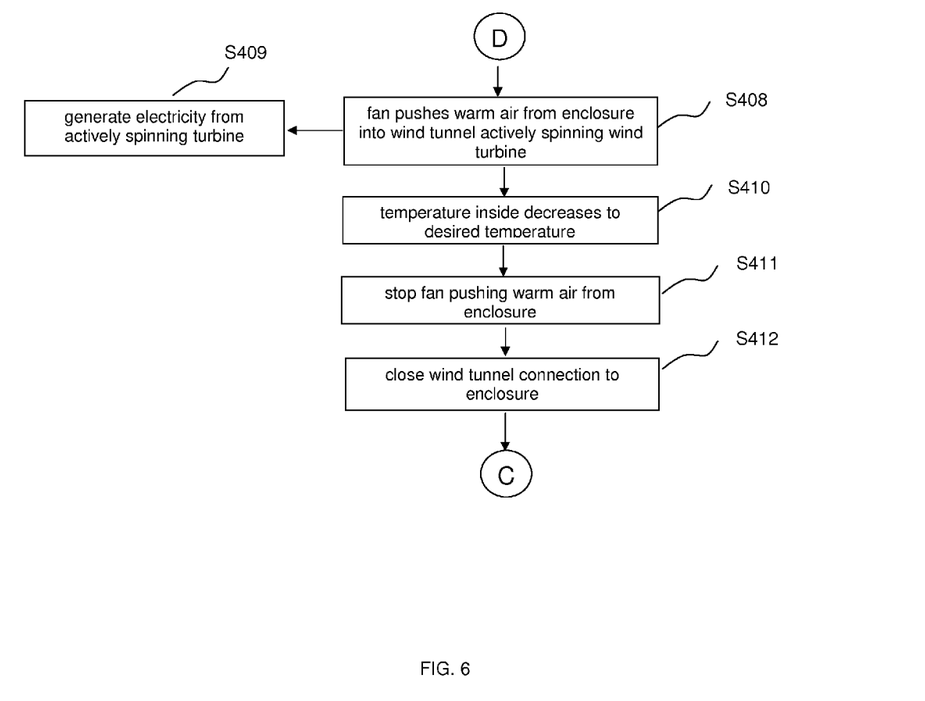

FIGS. 5 & 6 illustrate a flow chart outlining a method 400 for generating electricity whilst cooling a building according to another embodiment. As can be seen from S401 to S413 of FIGS. 5 & 6, method 400 cools the building by pushing warm air from the enclosure to the outside. In particular, method 400 differs from method 300 as follows: determination is made as to whether outside is cooler than enclosure (S403), fan direction is set so that the fan can push hot air from the enclosure outside (S404), wind tunnel air connection to the enclosure is opened (S405) and fan pushes warm air from enclosure into wind tunnel (S408) to actively spin wind turbine. Whilst method 400 assumes air is pushed from the enclosure, this method may also be used for pushing warm air from a space in the upper region of the building rather than an enclosure as such.

Whilst both methods 300 and 400 enable cooling of the building and concurrently generating electricity, methods for heating the building using the systems of the embodiments are also envisaged. For example, methods may be used analogous to the aforementioned processes for the purpose of pulling warm outside air inside the building when the inside is cooler than the outside.

Systems and apparatus for generating electricity according to the embodiments provide several benefits: utilizes solar, wind, thermal dynamics and/or battery power to create electricity; after the system pays for itself (approximately 2-3 years); it provides free electricity; and decentralization of electrical distribution.

LIST OF REFERENCE NUMERALS FOR FIGS. 1 & 2

1) The top of the turbine
2) Turbine blade

3) Bottom ring of turbine
4) Adjustable slot for the turbine to match the roof pitch
5) Base of turbine
6) Adjustable horizontal/vertical stabilizer bar for the alternator to be attached to the shroud.
7) Alternator
8) Vertical tie bar (main shaft) connected to the turbine and the alternator
9) Shroud
10) Solar/battery powered fan
11) Conduit
12) Positive connection to battery
13) Negative connection to battery
14) Battery
15) Controller/Microprocessor
16) Solar Panel
17) Inverter-changes DC to AC
18) A/C Fuse box (already in-home)
19) Roof line at the top of the house
20) Slope line of the roof
21) Soffit line of roof
22) Outside wall of house
23) Bottom of house
24) Lightning Arrestor
25) Mini breaker panel
26) Voltage regulator
27) Gearbox
28) Connector from gearbox to alternator
29) Air Conditioning Duct connected to the A/C Unit
30) Duct to attic
31) Sliding Panels
32) Conduit from sliding panel to microprocessor/controller
33) Removable air filter
34) Attachment for the gearbox to the shroud.
35) Attachment for the fan to the shroud.
36) Thermostat
50) Building
51) Wind turbine vent
54) Attachment for gearing system
55) Attachment for fan to air guiding device
56) Adjustable horizontal/vertical stabilizer bar for attaching generator to air guiding device
57) Electrical generator
58) Gearing system
60) Electric fan
61) First air flow connection
62) Second air flow connection
63) Air guiding device base
64) Open/closing device
70) Enclosure
71) Enclosure/open space duct
90) Air guiding device The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only.

The description as set forth is not intended to be exhaustive or to limit the scope of the invention. Many modifications and variations are possible in light of the above teaching without departing from the scope of the following claims. It is contemplated that the use of the present invention can involve components having different characteristics.

The embodiments of the invention in which an exclusive property or right is claimed are defined as follows.

Having thus described the invention what is claimed is:

1. A system for generating electrical energy, said system comprising:
   a wind turbine vent for attaching to a roof;
   a fan for moving air through said wind turbine vent to spin said wind turbine vent; wherein said fan is a reversible fan configured to selectively operate in one direction to push air through said wind turbine and in a reverse direction to pull air through said wind turbine vent;
   a shroud for locating in an attic beneath said roof; said shroud attaching said fan adjacent said wind turbine vent,
   an alternator fixed within said shroud and between said wind turbine vent and said fan,
   a shaft operably connecting said wind turbine vent with said alternator, said alternator generating electricity from spinning of said wind turbine vent
   at least one solar battery for powering said fan;
   a solar panel for powering said fan and/or said at least one battery; a controller configured to control sending of power from said solar panel to said fan and/or said at least one battery and sending of power from said at least one battery to said fan; and
   a panel slidably mounted at the base of said shroud such that, when said shroud is located in said attic, said panel is slidable between a first position in which said panel covers an inlet of an air conditioner duct and uncovers an outlet of an attic duct and a second position in which said panel uncovers said air conditioner duct inlet and covers said attic duct outlet
   whereby, when said system is installed in a house, said wind turbine vent turns as a result of outside wind, hot rising air escaping through said roof, moving air generated by said solar/battery powered fan, or a combination thereof, and thereby generates electricity.

2. The system of claim 1, further comprising a gear box connecting said shaft with said alternator.

3. The system of claim 2, wherein said controller is further configured to control sending of power from said solar panel to said fan, said at least one battery and/or said inverter.

4. The system of claim 1, further comprising a grid tie inverter for electrically connecting said alternator to the grid.

5. The system of claim 1, further comprising a controller configured to operate said slidable panel and said fan, such that in use, said controller operates said slidable panel to uncover said attic duct outlet and operates said reversible fan to push hot air from said attic to the outside through said wind turbine vent and further operates said slidable panel to uncover said air condition duct inlet and operates said reversible fan to pull air from outside through said wind turbine vent into said air conditioner duct.

6. The system of claim 5, wherein said controller is further configured to determine the temperature of the outside air, attic air and temperature of the interior of the house and to operate said slidable panel and said reversible fan to either push said hot air from said attic to the outside or pull air from outside into said air conditioner duct based on the temperature of the outside air, attic air and temperature of the interior of the house.

7. A system for generating electrical electricity in a building, said system comprising
   a wind turbine vent for attaching to a roof of a building;
   an electrical generator operably coupled to said wind turbine vent for generating electricity from spinning of said wind turbine vent;
   a fan for generating moving air through said wind turbine vent between the outside and inside of said building to spin said wind turbine vent; wherein said fan is a reversible fan configured to selectively operate in one direction to push air out through said wind turbine vent and in a reverse direction to pull air in through said wind turbine vent;

an air flow guiding device extending between said wind turbine vent and said fan for guiding said generated moving air between said wind turbine vent and said fan; wherein said fan is located within said air flow guiding device proximate a base thereof;

at least one air flow connection or inlet/outlet about said air guiding device base for connecting to at least one duct;

an opening/closing device for opening/closing said at least one air flow connection or inlet/outlet; and at least one solar panel for powering said fan;

whereby, when said system is installed on a building, said wind turbine vent turns as a result of outside wind, hot rising air escaping outside through said wind turbine vent, moving air generated by said fan powered by said solar panel(s), or a combination thereof, and thereby generates electricity.

8. The system of claim 7,
further comprising at least one solar battery for powering said fan; and a controller configured to control sending of power from said solar panel(s) to said at least one solar battery and control sending of power to said fan from said at least one solar battery and/or said at least one solar panel.

9. The system of claim 8, further comprising an inverter, operably connected to said alternator, for electrically connecting said alternator to the electrical grid or building electrical supply; and wherein said controller is further configured to switch power from said solar panel(s) selectively to said fan, said at least one battery and said inverter.

10. The system of claim 7, further comprising a gearing system operably connecting said wind turbine vent with said electrical generator.

11. The system of claim 7, wherein said at least one air flow connection comprises a first one of said air flow connection for connecting to an ac conditioner or ventilation duct and a second air flow connection for connecting to an enclosure/open space duct; and wherein said controller is configured to operate said opening/closing device and said fan such that, when said system is installed in the building, said opening/closing device opens said first air flow connection, closes said second air flow connection and operates said reversible fan to move air between said air conditioner or ventilation duct and the outside and further closes said first air flow connection, opens said second air flow connection and operates said reversible fan to move air between outside and said enclosure/open space.

12. The system of claim 11, further comprising a thermostat configured to determine the temperature of the outside, the enclosure/open space, and an interior room of the building; and wherein said controller is configured to operate said opening/closing device and said reversible fan based on the temperature of the outside air, attic air and temperature of the interior of the building, to either pull outside air through said wind turbine vent into said ac conditioner/ventilation duct and/or into said enclosure/open space, or to push air from said ac conditioner/ventilation duct and/or enclosure/open space through said wind turbine vent to the outside.

13. A method for generating electricity in a building, the method comprising the steps of providing a wind turbine vent in a roof of a building; an electrical generator operably connected to the wind turbine vent, the electrical generator being capable of converting spinning of said wind turbine vent into electricity; a solar powered fan disposed proximate said wind turbine vent for moving air; and an air guide for guiding moving air generated by said fan through the wind turbine vent; spinning the wind turbine vent using natural outside wind, spinning the wind turbine vent using rising air escaping the building, spinning the wind turbine vent by moving air through the wind turbine vent using the solar powered fan, or a combination thereof, generating electricity from the spinning wind turbine vent;

using at least one solar panel to power at least one solar battery;

powering said fan selectively using said at least one solar battery and said at least one solar panel, wherein powering said fan comprises powering said fan in one direction to push air from inside the building through said wind turbine vent to the outside and in a reverse direction to pull air through said wind turbine vent from the outside to the inside;

determining the temperature of the outside air, enclosure/open space beneath the roof, and a room of the building;

based on said determined temperature of the outside air, enclosure beneath the roof, and a room of the building, using said fan to push air from said enclosure/open space out and/or an air conditioner or ventilation duct through said turbine; and/or based on said determined temperature of the outside air, enclosure beneath the roof, and a room of the building, using said fan to pull air from outside through said wind turbine vent.

* * * * *